United States Patent
Neter et al.

(10) Patent No.: US 7,364,688 B2
(45) Date of Patent: Apr. 29, 2008

(54) METHOD FOR POST-MOLDING A MOLDED ARTICLE CONDITIONING APPARATUS WITH A SELECTIVELY CONTROLLED TRANSFER FLOW STRUCTURE

(75) Inventors: Witold Neter, Newnan, GA (US);
Omeir Shahid Ansari, Markham (CA);
Zbigniew Romanski, Mississauga (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 0 days.

(21) Appl. No.: 11/733,702

(22) Filed: Apr. 10, 2007

(65) Prior Publication Data

US 2007/0176331 A1  Aug. 2, 2007

Related U.S. Application Data

(63) Continuation of application No. 11/078,769, filed on Mar. 10, 2005, now Pat. No. 7,252,497.

(51) Int. Cl.
*B29C 45/72* (2006.01)

(52) U.S. Cl. .............................. 264/520; 425/547

(58) Field of Classification Search ............... 264/519, 264/520; 425/547, 572, 548, 574
See application file for complete search history.

(56) References Cited

U.S. PATENT DOCUMENTS

| 3,390,427 | A | * | 7/1968 | Ruekberg ................ 264/520 |
| 3,947,205 | A |   | 3/1976 | Edwards |
| 4,047,873 | A |   | 9/1977 | Farrell |
| 4,102,626 | A |   | 7/1978 | Scharrenbroich et al. |
| 4,208,177 | A |   | 6/1980 | Allen |
| 4,295,811 | A |   | 10/1981 | Sauer |
| 4,304,542 | A |   | 12/1981 | Sauer |
| 4,309,380 | A |   | 1/1982 | Sauer |
| 4,592,719 | A |   | 6/1986 | Bellehache et al. |
| 4,690,633 | A |   | 9/1987 | Schad et al. |
| 4,701,121 | A | * | 10/1987 | Jakobsen et al. ........... 264/520 |
| 4,729,732 | A |   | 3/1988 | Schad et al. |
| 4,872,827 | A |   | 10/1989 | Noda |
| 5,051,085 | A |   | 9/1991 | Masumoto |
| 5,788,926 | A |   | 8/1998 | Oda et al. |
| 5,804,127 | A |   | 9/1998 | Takatori |
| 5,837,299 | A |   | 11/1998 | Bright et al. |
| 5,850,590 | A |   | 12/1998 | Furuta et al. |

(Continued)

FOREIGN PATENT DOCUMENTS

JP  56113433 A2  9/1981

(Continued)

*Primary Examiner*—Tim Heitbrink

(57) ABSTRACT

A cooling tube assembly for operating on a malleable molded plastic part. The cooling tube assembly comprising a porous tube/insert having a profiled inner conditioning surface, and a vacuum structure configured to cooperate with the porous tube. In use, the vacuum develops a reduced pressure adjacent the inner conditioning surface to cause an outer surface of the malleable molded plastic part, locatable within the cooling tube assembly, to contact the inner conditioning surface of the porous insert so as to allow a substantial portion of the outer surface of the malleable part, upon cooling, to attain a profile substantially corresponding to the profile of the inner conditioning surface. The cooling tube assembly further including a suction channel therein that is configured to cooperate with a valve member for the control of a suction flow therethrough that assists in a transferring of the molded article into the cooling tube assembly.

2 Claims, 11 Drawing Sheets

U.S. PATENT DOCUMENTS

| | | |
|---|---|---|
| 6,042,361 A | 3/2000 | Murphy |
| 6,113,834 A | 9/2000 | Kozai et al. |
| 6,171,541 B1 | 1/2001 | Neter et al. |
| 6,190,157 B1 | 2/2001 | Hoffsteter et al. |
| 6,461,556 B1 | 10/2002 | Neter |
| RE038,480 E | 3/2004 | Catoen et al. |
| 6,737,007 B2 | 5/2004 | Neter et al. |
| 2001/0048988 A1 | 12/2001 | Forte et al. |
| 2002/0074687 A1 | 6/2002 | Neter et al. |
| 2002/0088767 A1 | 7/2002 | Saito et al. |
| 2002/0179613 A1 | 12/2002 | Matsui et al. |
| 2003/0096661 A1 | 5/2003 | Kim |
| 2003/0167799 A1 | 9/2003 | Tijerina-Ramos et al. |
| 2006/0204608 A1 | 9/2006 | Neter et al. |

FOREIGN PATENT DOCUMENTS

| | | |
|---|---|---|
| JP | 61120723 A2 | 6/1986 |
| JP | 7276485 A2 | 10/1995 |
| WO | 9739874 A1 | 10/1997 |
| WO | 03086728 A1 | 10/2003 |
| WO | 04007170 A1 | 1/2004 |

* cited by examiner

METHOD FOR POST-MOLDING A MOLDED ARTICLE CONDITIONING APPARATUS WITH A SELECTIVELY CONTROLLED TRANSFER FLOW STRUCTURE

CROSS-REFERENCE TO RELATED PRIOR APPLICATION

This application is a continuation of prior application Ser. No. 11/078,769, filed on Mar. 10, 2005 now U.S. No. 7,252,497 and claims the benefit therefrom.

TECHNICAL FIELD

The present invention relates, in general, to a post-molding molded article conditioning apparatus and is particularly, but not exclusively, applicable to a cooling tube assembly used in a plastic injection-molding machine to cool plastic parts, such as plastic parisons or preforms. More particularly, the present invention relates to a structural configuration of the cooling tube assembly, and also to method of manufacturing and using such devices, for example in the context of a manufacturing process for preforms made from polyethylene terephthalate (PET) or the like.

BACKGROUND OF THE INVENTION

In order to improve the efficiency of a molding system, or to enhance the qualities of the molded articles produced therein, molding systems have evolved to include a myriad varieties of post-molding molded article conditioning systems. Of these conditioning systems, most are configured to simply alleviate in-mold cooling time, and hence operate to reduce the overall duration of the molding cycle. However, it is also known to configure and use post-molding molded article conditioning systems to enhance the characteristics of the molded article (e.g. impart localized crystallinity in the plastic structure; impart a temperature profile to the molded article that is suitable for a subsequent molding process; reshaping of a portion of the molded article; removing of unwanted features such as gate vestige; etc.).

As an example, and without specific limitation, a typical injection molding system 2 that includes a post-molding molded article conditioning system is shown with reference to FIG. 1. The injection molding system 2 is configured for the production of plastic preforms 32 (or parisons) that are used in the blow molding of bottles. As a further example, the injection molding system could be an INDEX (Trademark of Husky Injection Molding Systems Ltd.) molding system such as that described in U.S. Pat. No. 6,113,834 to Kozai et al., issued Sep. 5, 2000.

Referring back to FIG. 1, the injection-molding system 2 comprises molding structure that includes, without specific limitation, a clamp unit 4 with an injection mold arranged therein, an injection unit 6, and a robot 8 with an end-of-arm-tool (EOAT) 11 arranged thereon. The injection mold comprises complementary mold halves 12, 14, with one or more preform mold cavities configured therein. Each mold cavity is configured in a stack of cooperating molding inserts that include a core 22 and a cavity 24, that are disposed on the mold halves 12, 14. The injection mold halves 12, 14, (shown in an open configuration in FIG. 1) are mounted between a fixed and a movable platen 16, 18 of the clamp 4. A set of tie bars 20 connect the platens 16, 18 with a clamp mechanism 21. The EOAT 11 comprises a take-out plate 28 with a one or more preform cooling tube assemblies 30 arranged on a surface thereof. The number of cooling tube assemblies 30 on the surface of the take-out plate 28 is equal to, or a multiple of, the number of mold cavities configured in the mold.

The EOAT 11 may be advantageously configured to include the cooling tube assembly 30 that is described in commonly assigned U.S. Pat. No. 6,737,007 to Neter et al., issued May 18, 2004, or the similarly configured cooling tube assembly described in commonly assigned PCT patent application WO 03/086,728 to Pesavento, published Oct. 23, 2003. In particular, the cooling tube assembly 30 is configured for a post-molding conditioning of at least a portion of a malleable injection molded perform received therein. The cooling tube assembly 30 includes a conditioning body (not shown) with a conditioning cavity that is configured therein along a cooled inner conditioning surface. The conditioning cavity is configured to sealingly receive, and thereafter condition, the portion of the preform by expanding at least a portion of an outer surface thereof into contact with the cooled inner conditioning surface. Accordingly, the conditioning body is configured for connection with a heat dissipation path (not shown) and an air pressure structure, via the take-out plate 28, to perform the preform conditioning as will be explained in further detail hereinafter. The air pressure structure may be selectably configured to be connected to a vacuum pump 34 or a source of compressed air (not shown). In more detail, the conditioning body is configured to include a porous insert (not shown) that is formed from a thermally conductive porous material, such as porous aluminum. The porous insert is configured to include a porous inner conditioning surface configured therein that provides at least a portion of the inner conditioning surface of the conditioning cavity. The porous insert is further configured to connect the inner porous surface thereon with the heat dissipation path and the air pressure structure to perform the conditioning of the preform portion.

An injection molding process cycle for the production of one or more preforms begins with the step of closing of the mold by moving of the movable platen 18 relative to the fixed platen 16 by means of stroke cylinders (not shown), or the like, to close the mold. A mold clamping force is then applied to the mold halves 12, 14 by the clamp mechanism 21. Next, the injection unit fills and pressurizes the mold cavities and a corresponding number of preforms are formed. The mold is then opened once the molded preforms have been partially cooled in the mold to an extent required to avoid significant deformation thereof during a subsequent step of ejection. The robot 8 then positions the end-of-arm-tool (EOAT) 11 between the mold halves 12, 14 to align the cooling tube assemblies 30 with the one or more preforms that are retained on their cores 22. The preforms are then ejected from the mold cores 22, by an actuation of a mold stripper plate 33, and the preforms are transferred into the cooling tube assemblies 30. The robot 8 then withdraws the EOAT 11 from between the mold halves 12, 14 and the molding cycle can repeat.

Contemporaneously to the molding of a subsequent shot of preforms 32, a post-molding conditioning process is performed in the cooling tube assemblies 30 that begins with the step of transferring the partially cooled, and hence malleable, preforms 32 from the mold cores 22 into the cooling tube assemblies 30. The foregoing transfer is generally assisted by a suction flow of air that is established along the inner conditioning surface of the conditioning cavity to a suction channel (not shown) that is configured in an end portion in the conditioning body and that is connected with the air pressure structure. Once at least a portion of the preforms 32 are sealingly received in the cooling tube assemblies 30, an outer surface of the each preform portion is expanded into contact with the cooled inner conditioning surface of the respective conditioning cavity. The foregoing is accomplished by evacuating any air contained between the outer surface of the preform 32 and the inner conditioning surface of the conditioning body through the porous inner conditioning surface of the porous insert under an applied vacuum provided by the air pressure structure/ vacuum pump 34. Thereafter, the outer surface of the preform 32 is kept in contact with the cooled inner conditioning surface of the conditioning body, by maintaining the vacuum, until the preform 32 has been solidified to an extent required to maintain its shape once ejected from the cooling tube assembly. Thereafter, the preforms 32 are ejected from their respective cooling tube assemblies 30 by connecting the air pressure structure to the source of compressed air and pressurizing of the conditioning cavity by blowing air through the porous inner conditioning surface of the porous insert and also possibly through the pressure channel.

It is the ability of the cooling tube assembly 30 to expand, and to maintain, any desired portion of the outer surface of a preform 32 in an intimate contact with the cooled inner conditioning surface thereof that provides for significant advantage. In particular, the intimate contact provides for optimal conductive heat transfer efficiency therebetween, while also assuring a homogenous cooling of the outer surface of the preform that avoids certain types of defects (e.g. banana shaped preforms, ovality, gate vestige stretching, gate vestige crystallinity, etc.). Moreover, it is also possible to configure the cooled inner conditioning surface of the cooling tube assembly 30 to perform a shape correction of the preform (i.e. substantially prevent preform shape variations that are commonly caused by variations in the molding process, post-molding cooling, shrinkage, etc.) or to significantly re-shape the preform as desired (e.g. for the purposes of preferential blow molding as described in detail in WO 03/086,728, as introduced hereinbefore.

Despite the significant improvements that are available through the use of the various known molded article conditioning apparatus, and in particular the cooling tube assembly 30 described hereinbefore, there does however remain areas for further improving the structure and operation thereof.

For instance, while it is desirable to provide the cooling tube assembly 30 with a suction channel, as previously described, for assisting in the transfer of the preform 32 from the mold core 22 thereto, a continued application of vacuum pressure therethrough during the step of preform expansion and cooling can be the cause certain defects in the preform 32. In particular, a gate vestige 80A located on an end portion 80 of the preform 32, as shown with reference to FIG. 3B, can be significantly deformed as it is being sucked down the suction channel. Accordingly, it is desired to configure an improved cooling tube assembly that includes a means for controlling the suction flow through the suction channel whereby the suction channel remains connected to the air pressure structure only during the step of preform transfer.

Similarly, it is desired to configure the porous insert with an improved structure for connecting the air pressure structure with the inner porous surface disposed thereon.

Likewise, it is desired to configure a porous insert with a simplified cooling configuration.

SUMMARY OF THE INVENTION

In accordance with a first aspect of the present invention, a method is provided for molding an article in a molding system that includes a molding machine and a post-molding molded article conditioning apparatus. The method includes the steps of molding a molded article, configuring a pressure structure connected to said conditioning apparatus to function as a vacuum source, moving a valve member of said conditioning apparatus into an open configuration to connect a conditioning cavity of said conditioning apparatus to said vacuum source through a transfer flow structure of said conditioning apparatus, transferring said molded article, in a malleable state, into said conditioning cavity with the assistance of suction provided through said transfer flow structure, moving said valve member into a closed configuration once a portion of said molded article has been sealingly received within said conditioning cavity, expanding an outer surface of said portion of said molded article into contact with a cooled inner conditioning surface of said conditioning cavity by evacuating any air contained between said outer surface of said molded article and said cooled inner conditioning surface through a plurality of openings configured along at least a portion of said cooled inner conditioning surface and through to said pressure structure via a pressure coupling structure of said conditioning apparatus, maintaining a vacuum to hold said outer surface of said preform in contact with said cooled inner conditioning surface of said conditioning cavity until said molded article has solidified to an extent required to maintain its shape once ejected from said conditioning apparatus, ejecting said molded article from said conditioning cavity.

The valve member is preferably configured to include a top surface for supporting an adjacent portion of the outer surface of the molded article.

The conditioning apparatus is preferably configured to include a porous insert formed from a first porous material and wherein at least a portion of said inner conditioning surface is disposed thereon. The porous insert including the plurality of flow channels therein as a network of interconnected interstitial spaces.

In an alternative embodiment of the present invention the conditioning apparatus may be configured to include a porous member that is configured with the first porous material providing an inner porous portion that is at least partially enclosed, on an outer surface thereof, by an outer porous portion formed from a second porous material, the second porous material having a network of interconnected interstitial spaces that function as the pressure coupling structure.

In accordance with yet another embodiment of the invention, the porous member includes at least one cooling channel configured thereon, and wherein a surface of the cooling channel includes a surface treatment therealong for a substantial sealing thereof to avoid leakage of a coolant to be circulated therethrough. Preferably, the cooling channel is configured on an outer surface of said porous member, and wherein an outer surface of the porous member has been configured to include the surface treatment, and the outer surface being further configured to receive a sleeve for enclosing the at least one cooling channel.

BRIEF DESCRIPTION OF THE FIGURES

Exemplary embodiments of the present invention will now be described with reference to the accompanying Figures, in which.

DETAILED DESCRIPTION OF THE PREFERRED EMBODIMENT(S)

Figure 2:
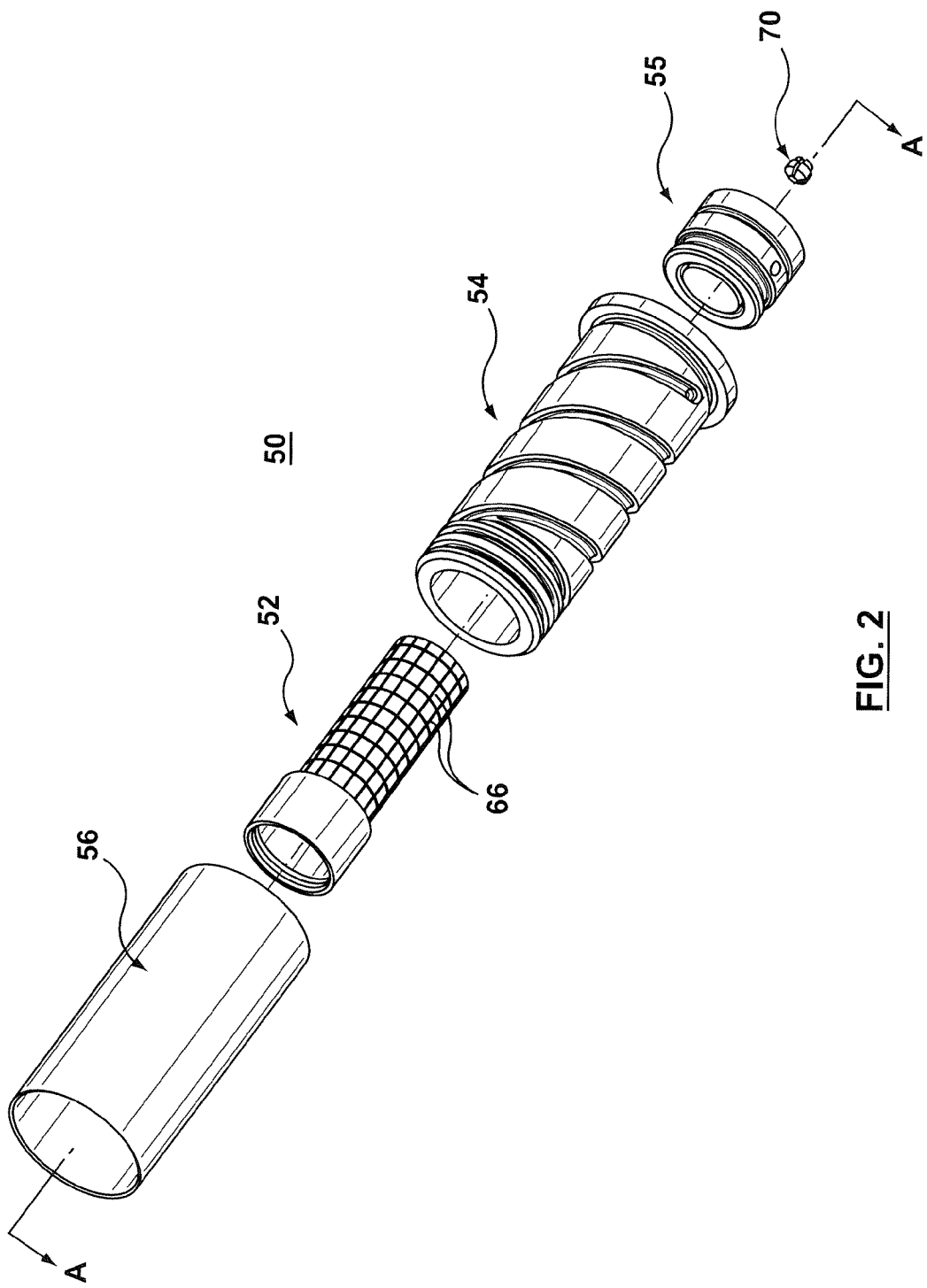
FIG. 2 depicts an exploded isometric view of a cooling tube assembly according to an embodiment of the present invention.
Figure 3A:
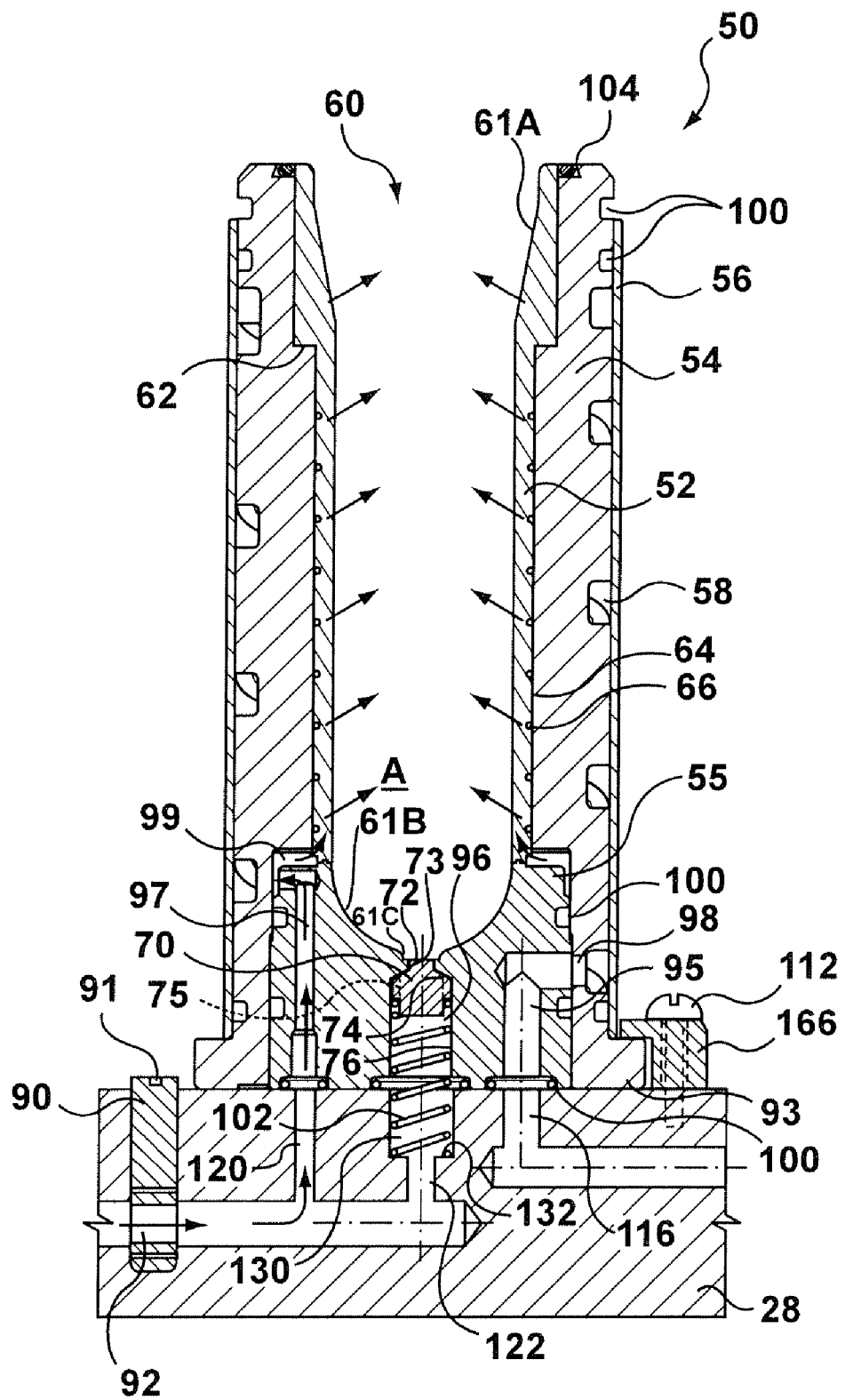
FIG. 3A depicts a sectional view of the cooling tube assembly of FIG. 2, taken along the line A-A, that is arranged on a take-out plate (shown in partial section), with a suction channel valve member being arranged in a closed configuration as a porous inner conditioning surface of a conditioning cavity is undergoing a post-ejection cleaning purge.
Figure 3B:
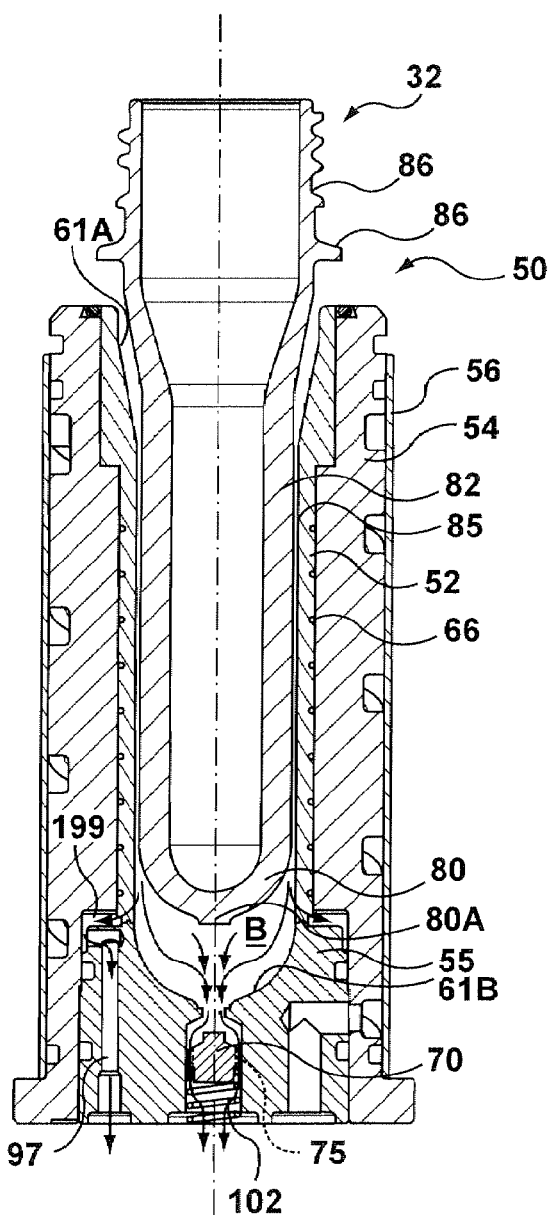
FIG. 3B depicts the section view of the cooling tube assembly of FIG. 3A, with the suction channel valve member being arranged in an open configuration to configure a suction flow as a malleable preform is shown partially received in the conditioning cavity.
Figure 3C:
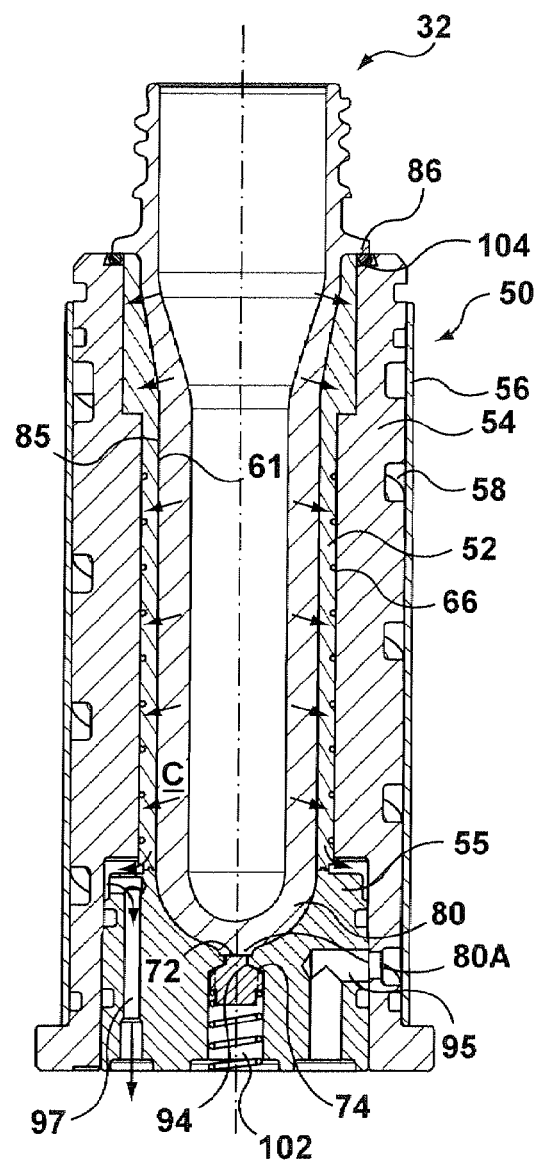
FIG. 3C depicts the section view of the cooling tube assembly of FIG. 3A, with the suction channel valve member being arranged in a closed configuration as a malleable preform is being cooled with an outer surface thereon having been expanded into contact with the porous inner conditioning surface of the conditioning cavity.
Figure 3D:
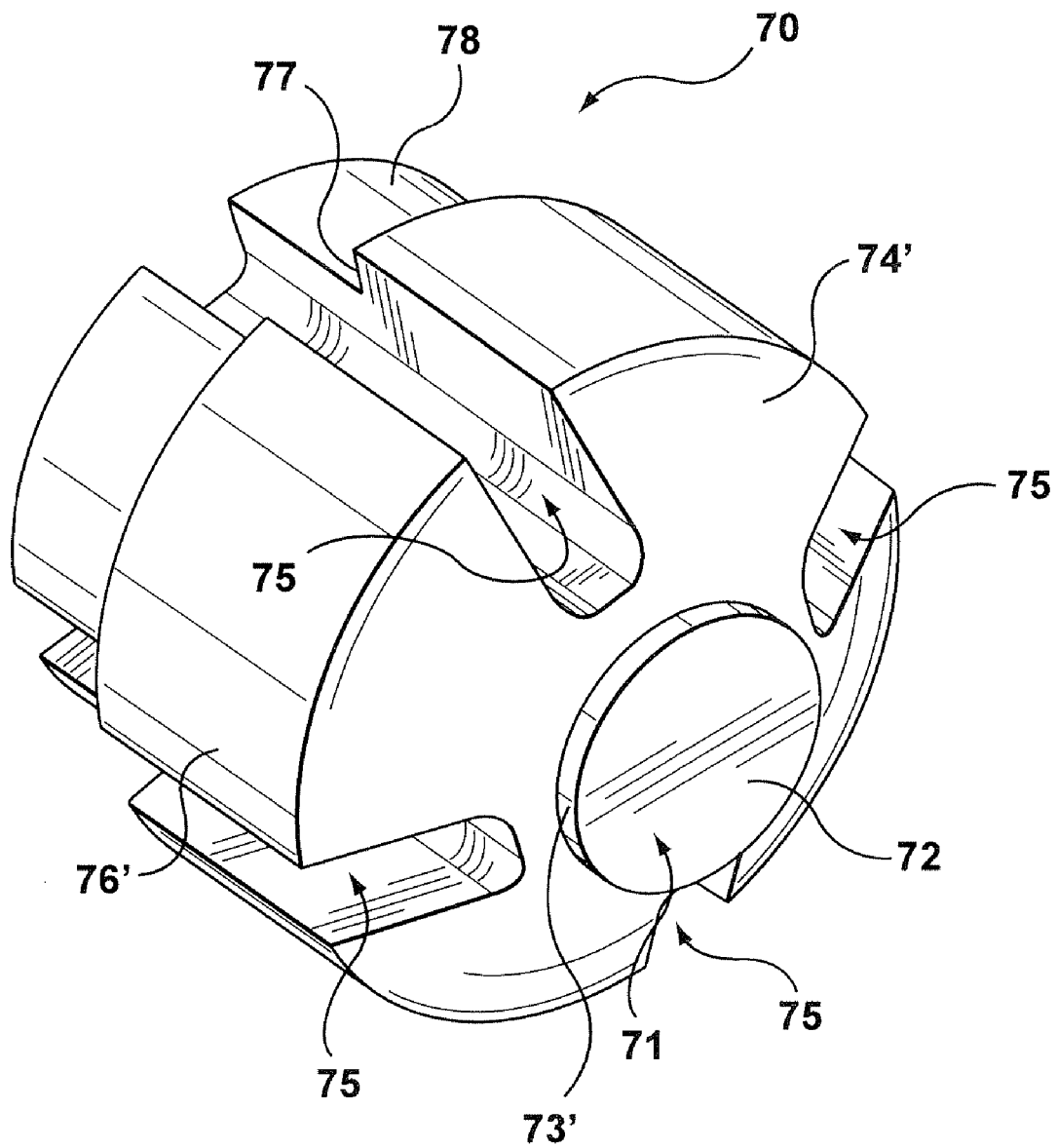
FIG. 3D depicts an isometric view of a valve member in accordance with an embodiment of the present invention.

With reference to FIG. 2, a cooling tube assembly 50 in accordance with an embodiment of the present invention is shown. The cooling tube assembly 50 is configured for use with an end-of arm-tool 11 in an injection molding system 2 for a post-molding conditioning of at least a portion of a malleable injection molded preform 32. The cooling tube assembly 50 includes a valve member 70, a base insert 55, a cooling tube 54, a porous insert 52, and a sleeve 56.

The construction and use of the embodiment of the cooling tube assembly 50 will be described with reference to FIGS. 3A, 3B, 3C and 3D.

The base insert 55 comprises a substantially cylindrical body. An inner conditioning surface 61B is configured in the cylindrical body that preferably reflects a shape of an outer surface of an end portion 80 of the preform 32. The inner conditioning surface 61B includes a gate vestige portion 61C that is again preferably configured to receive a gate vestige 80A that is centrally located at a distal end of the preform 32. An outer cylindrical surface of the cylindrical body is configured to arrange the base insert 55 in a complementary shaped first bore that is configured through a bottom surface of the cooling tube 54. An inlet and an outlet cooling channel 95 are configured in the cylindrical body between a bottom surface thereof, for connection with coolant inlet and outlet ports 116 provided on a carrier plate 28 of the end-of-arm-tool 11, and the outer cylindrical surface, for connection with an inlet and an outlet coolant connecting channel 98 configured in the cooling tube. A connecting pressure channel 97 is configured in the cylindrical member between the bottom surface, for connection with a pressure port 120 provided on the carrier plate 28, and the outer cylindrical surface substantially adjacent an annular pressure channel 99. The annular pressure channel 99 is configured between a top surface of the base insert 55, a top surface of the first bore in the cooling tube 54, and the outer surface of the porous insert 52. A suction channel 96 is also configured in the cylindrical body, along the longitudinal axis thereof, between the bottom surface and through the gate vestige portion of the end surface 61C.

In more detail, the suction channel 96 preferably includes the following portions, listed from top to bottom. An orifice that is configured at the interface between the suction channel 96 and the inner conditioning surface 61C. A cylindrical spigot portion 73 that is configured to receive a complementary cylindrical spigot portion 73' of the valve member 70. A tapered sealing portion 74 that is configured to cooperate with a complementary sealing portion 74' provided on the valve member 70, when the valve member is in a closed configuration. A cylindrical portion 76 that is configured to function as a valve cylinder for a reciprocation of the valve member 70 therein, between the closed and an open configuration. A distal end of the suction channel 96 being configured for connection with a suction pressure port 122 of the carrier plate 28.

The porous insert 52 comprises a tubular body preferably formed from a thermally conductive first porous material. A porous inner conditioning surface 61A is configured on the tubular body that preferably reflects a shape of an outer surface of a body portion 80 of the preform 32. An outer cylindrical surface 64 of the tubular body being configured to arrange the porous insert 52 in a complementary shaped second bore provided in the cooling tube 54 such that the bottom surface of the base insert 55 is arranged adjacent the top surface of the porous insert. A network of pressure distribution channels 66 are configured along an outer surface 64 of the porous insert, best shown with reference to FIG. 2, and that extend from the bottom surface thereof for connection with the annular pressure channel 99. In addition, a network of interconnected interstitial spaces in the first porous material of the tubular body provide a plurality of flow channels that fluidly connect the porous inner conditioning surface 61A with the network of distribution channels 66.

The first porous material preferably comprises a sintered matrix of powder particles, of a thermally conductive material, having a predominant size in the range of 5 µm to 40 µm to produce resulting interstitial spaces of a size and shape that substantially avoids imparting a noticeable change in a finish of the outer surface of the preform 32. More preferably, the predominant size of said particle is in the range of 8 µm to 20 µm. More preferably still, the predominant particle size is about 12 µm. Accordingly, the presently preferred porosity (i.e. size of the interstitial spaces) along the inner porous conditioning surface is about 12 µm.

The presently preferred thermally conductive material is bronze particles. However, other suitable metals could be used, such as aluminum. In addition, it may also be possible to use thermally conductive ceramics such as silicon carbide and a tungsten carbide.

The cooling tube 54 comprises a substantially tubular body preferably made from a thermally conductive material. The tubular body including the first bore, longitudinally extending along a bottom portion thereof, that is configured for receiving the base insert 55. The second bore, configured for receiving the porous insert 52, is configured to longitudinally extend along an upper portion thereof. The inlet and an outlet coolant connecting channels 98 are configured between an inner surface of the first bore and ends of a cooling channel 58 that is configured in an outer surface of the cooling tube 54. The outer surface of the cooling tube 54 is further configured to cooperate with an inner surface of the sleeve 56 to sealingly enclose the cooling channel 58. Preferably, a groove configured in a top surface of the cooling tube 54, adjacent the porous insert 52, is configured to receive an end seal 104 for cooperating with a bottom surface of a preform support ledge portion 86 for sealingly enclosing a portion of the outer surface of the preform 32 within the cooling tube assembly 50. A bottom portion of the cooling tube 54 is configured to include a flange 93 for arranging and retaining the cooling tube assembly 50 on the carrier plate 28.

The seal member 104 is preferably shaped to include an inwardly projecting lip to assist in its retention in the groove provided on the tube body 54. Preferably the seal member 104 is made from a low-durometer silicone, preferably with a durometer value of about 50, to avoid deforming the bottom surface of the preform support ledge 86.

The sleeve 56 comprises a substantially tubular body with the inner cylindrical surface for enclosing the coolant channel on the outside of the cooling tube 54 as described hereinbefore.

The valve member 70 comprises a substantially cylindrical body. The valve member 70 preferably includes the following portions, listed from top to bottom. A gate vestige support face 72 arranged on a top surface of a cylindrical spigot portion 71. The support surface 72 being configured to support a bottom face of the preform gate vestige 80A when the valve member 70 is arranged in the closed configuration. An outer surface 73' of the cylindrical spigot portion 71 is configured to cooperate with the cylindrical spigot portion 73 of the suction channel 96 to assist in positioning the gate vestige support face 72 adjacent the gate vestige portion 61C. The complementary tapered sealing face 74' is configured as an outwardly tapering face for cooperating with the suction channel sealing face 74 for the selective closing of the suction channel (i.e. isolating the suction channel orifice from the air pressure structure). A complementary cylindrical portion 76' of the outer surface of the cylindrical body is configured for cooperation with the cylindrical portion 76 of the suction channel 96 for supporting an aligned reciprocation of the valve member 70 therein. The valve member 70 also includes a set of four shallow, equi-spaced, longitudinally aligned, bypass pressure channels 75 that are configured through the outer surface of the cylindrical body around the periphery of the complementary cylindrical portion 76'. The bypass pressure channels 75 each include a first opening on the tapered sealing portion 74', and a second opening on a bottom face of the cylindrical body. The first opening being exposed when the valve member 70 is arranged in the open configuration and is obstructed by the tapered sealing portion of the suction channel 96 when the valve member is arranged in the closed configuration. Accordingly, the bypass pressure channels 75 provide a fluid connection along the cylindrical body when the valve member is in the open configuration. A cylindrical spring seat portion being configured around an end portion of the cylindrical body between a radial relief 78 and an upper shoulder 77. The spring seat portion is configured to retain a first end portion of a spring 102 that biases the valve member 70 into the closed configuration. A second end portion of the spring 102 is preferably arranged on a shoulder 132 provided at the base of a bore 130 that is configured along an upper portion of the suction pressure port 122 in the carrier plate 28.

Preferably, a pressure port valve 90 may be configured in the carrier plate 28 adjacent each cooling tube assembly 50 that is configured for selectively opening or closing the air pressure structure that connects therewith. Accordingly, one or more cooling tube assemblies 50 of a multi-tube array can be selectively disconnected. This is particularly advantageous feature in case of a molding system 2 fault that shuts down one or more molding cavities.

Figure 1:
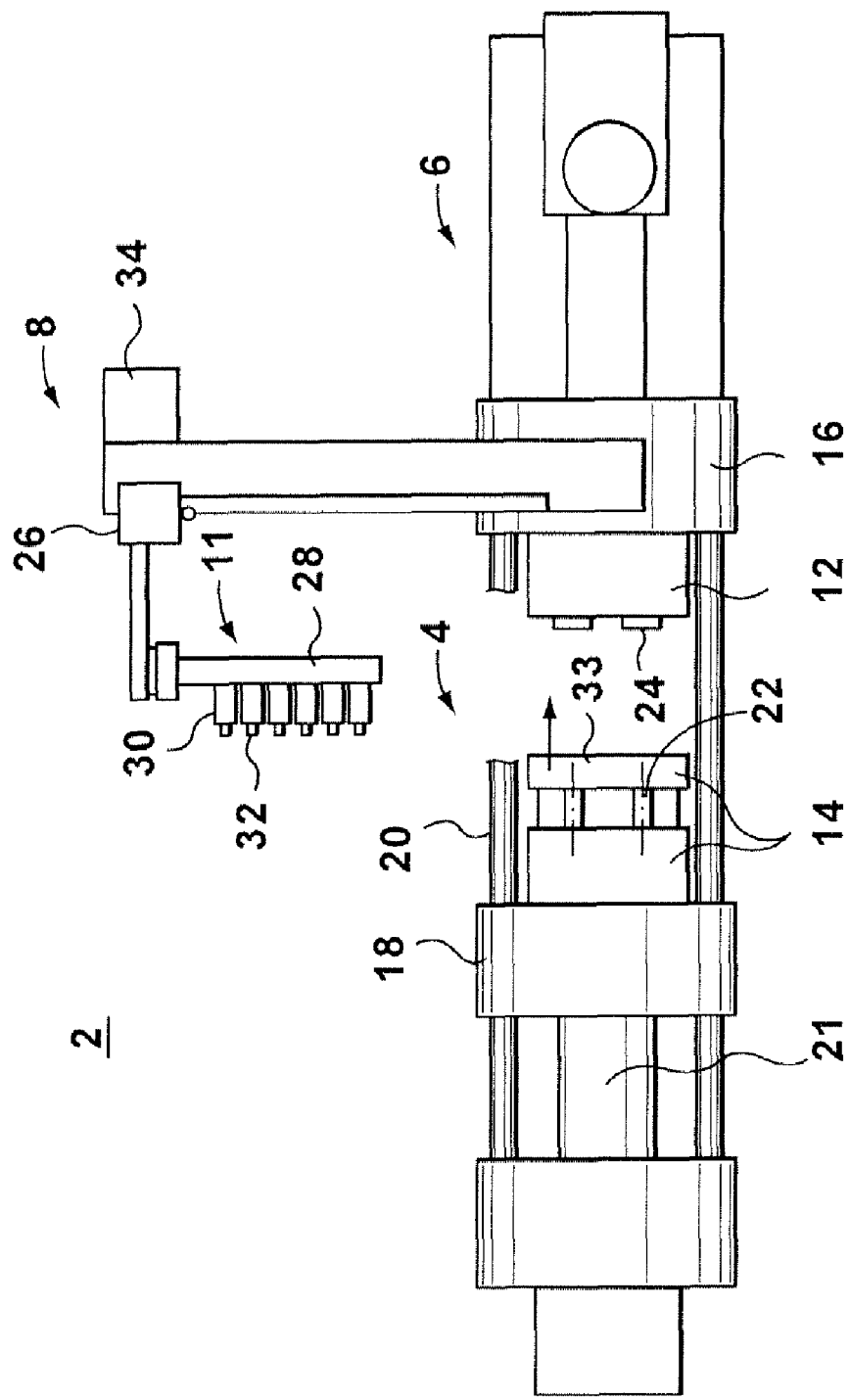
FIG. 1 is a plan view of a typical injection molding machine including an injection unit, clamp unit, robot, mold, and end-of-arm tool.

A method for molding a preform 32 in an injection molding system 2, as shown with reference to FIG. 1 and further including the cooling tube assembly 50 of the present invention, involves the known steps of molding and conditioning that were described hereinbefore and with the additional steps of operating the suction channel valve member 70. In particular, prior to the commencement, or during midst, of the step of transferring the malleable preforms 32 from the mold cores 22 into the cooling tube assemblies 50, an additional step of moving of the suction valve member 70 into the open configuration is performed. In so doing, a suction flow is established through the suction channel 96, as generally indicated by the air flow lines at symbol 'B' with reference to FIG. 3B. Once the preform 32 is substantially received in the conditioning cavity of the cooling tube assembly 50, an additional step of moving of the suction valve member 70 into the closed configuration is performed. In so doing, the suction channel 96 is closed, and a bottom surface of the preform gate vestige 80A is preferably supported by the support surface 72 of the valve member 70. The known process of conditioning the preform can then be followed, including the first effective step of preform conditioning wherein the outer surface of the preform 32 is expanded into contact with the cooled inner conditioning surface of the cooling tube assembly 50 by air evacuation, as generally indicated by the air flow lines at symbol 'C' with reference to FIG. 3C. Thereafter, the second effective step of conditioning is performed wherein the preform 32 is cooled in a sustained contact with the inner conditioning surface of the cooling tube assembly 50. Once fully conditioned, the preform 32 may be ejected from the cooling tube assembly 50. Preferably, the step of ejection may be performed by configuring the air pressure source to provide a positive air pressure wherein an outward flow through the porous inner conditioning surface 61A of the cooling tube assembly 50 is established, as generally indicated by the air flow lines at symbol 'A' with reference to FIG. 3A, a pressurization of the conditioning cavity propels the preform 32 therefrom.

As an example, for sake of operating an EOAT 11 with twenty-four cooling tube assemblies 50 arranged thereon, a vacuum pressure of between 61 and 71 centimeters of Mercury (24-28" Hg) is preferred.

Figure 4A:
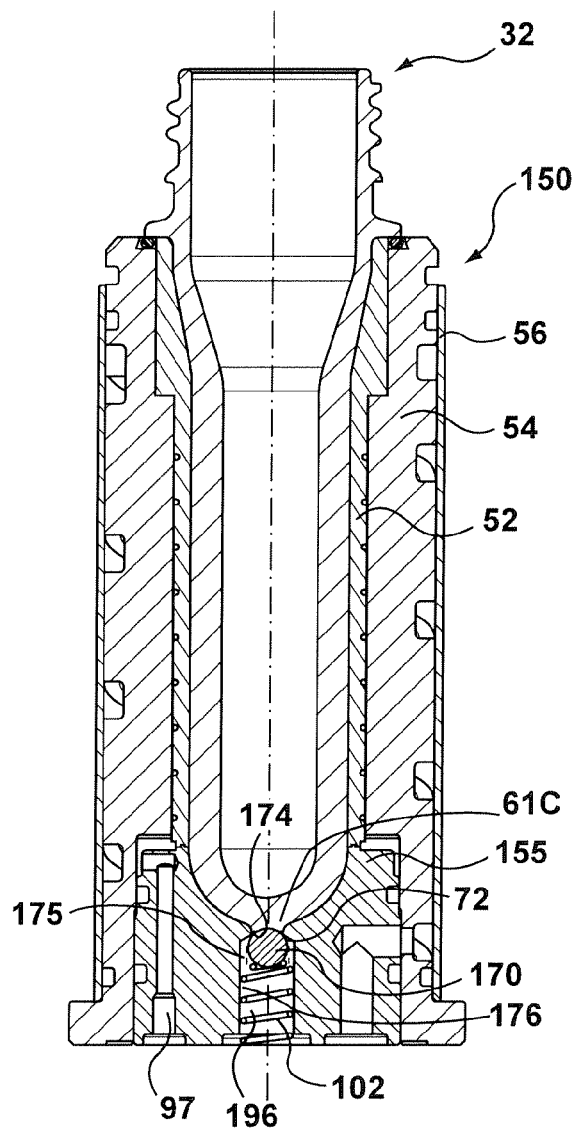
FIG. 4A depicts a section view of a cooling tube assembly according to a first alternative embodiment of the present invention that includes an alternative configuration of the suction channel and valve member.

With reference to FIG. 4A, a cooling tube assembly 150 in accordance with a first alternative embodiment of the present invention is shown. The cooling tube assembly 150 is configured substantially the same as the embodiment of the invention, and as shown with reference to FIGS. 2 and 3A and as previously described, the differences being in the configuration of the suction channel 196 and the valve member 170. Accordingly, only the differences in structure and operation will be described.

The suction channel 196 is preferably configured to include the following portions, listed from top to bottom. An orifice that is configured at the interface between the suction channel 196 and the inner conditioning surface 61C. A spherical sealing portion 174 that is configured to cooperate with a complementary spherical outer surface 174' provided on a ball valve member 170, when the valve member is in a closed configuration. A cylindrical portion 176 that is configured to provide a passageway for a reciprocation of the ball valve member 170 therein, between the closed and an open configuration. The cylindrical portion 176 being configured to be wider than the diameter of the ball valve member 170 whereby an annular pressure bypass channel 175 is configured therebetween that functions to provide a fluid connection along the length of the ball valve member in the open configuration. A distal end of the suction channel 96 being configured for connection with a suction pressure port 122 of the carrier plate 28.

Figure 4B:
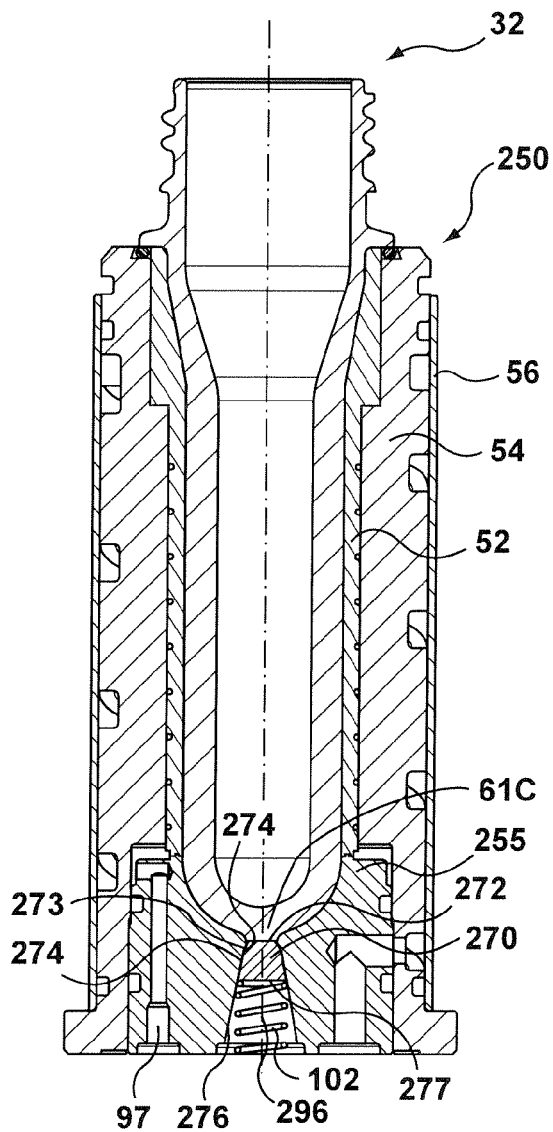
FIG. 4B depicts a section view of a cooling tube assembly according to a second alternative embodiment of the present invention that includes an alternative configuration of the suction channel and valve member.

With reference to FIG. 4B, a cooling tube assembly 250 in accordance with a second alternative embodiment of the present invention is shown. The cooling tube assembly 250 is configured substantially the same as the embodiment of the invention, and as shown with reference to FIGS. 2 and 3A and as previously described, the differences being in the configuration of the suction channel 296 and the valve member 270. Accordingly, only the differences in structure and operation will be described.

The suction channel 296 is preferably configured to include the following portions, listed from top to bottom. An orifice that is configured at the interface between the suction channel 296 and the inner conditioning surface 61C. A conical bore 276 that includes a sealing portion 274 at the top thereof that is configured to cooperate with a complementary conical outer surface 274' provided on a frustoconical valve member 270, when the valve member is in a closed configuration. The conical bore 276 being configured to be longer than the valve member 276 to allow for a reciprocation of the valve member 270 therein, between the closed and an open configuration. An annular pressure bypass channel (not shown) is configured between the outer surface of the valve member 270 and the inner surface of the conical bore 296 to provide a fluid connection along the length of the valve member 270 in the open configuration. A distal end of the suction channel 296 being configured for connection with a suction pressure port 122 of the carrier plate 28.

Figure 5A:
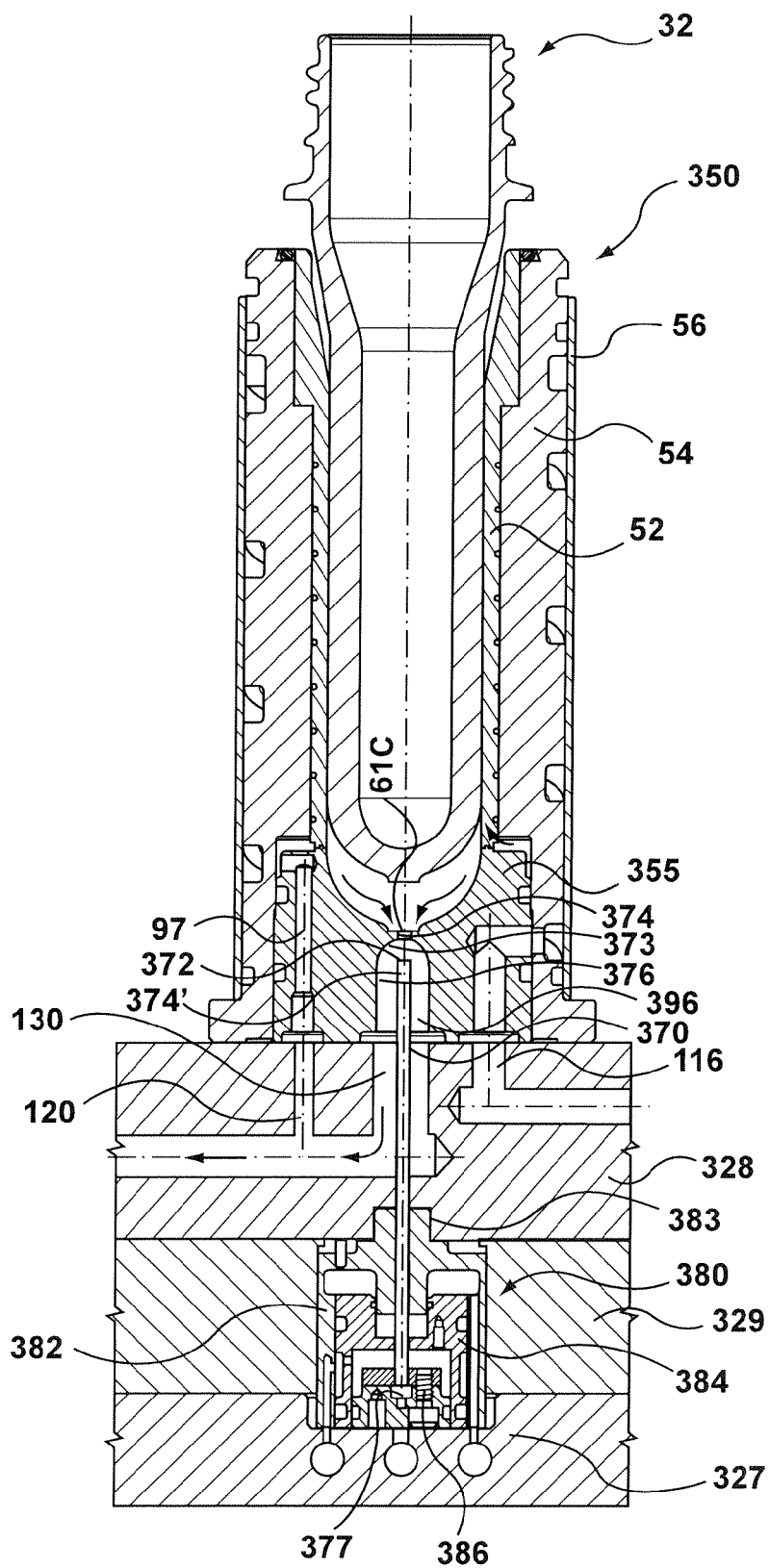
FIG. 5A depicts a section view of a cooling tube assembly according to a third alternative embodiment of the present invention that includes an alternative configuration of the suction channel and valve member, the valve member being arranged in an open configuration to configure a suction flow as a malleable preform is shown partially received in the conditioning cavity.
Figure 5B:
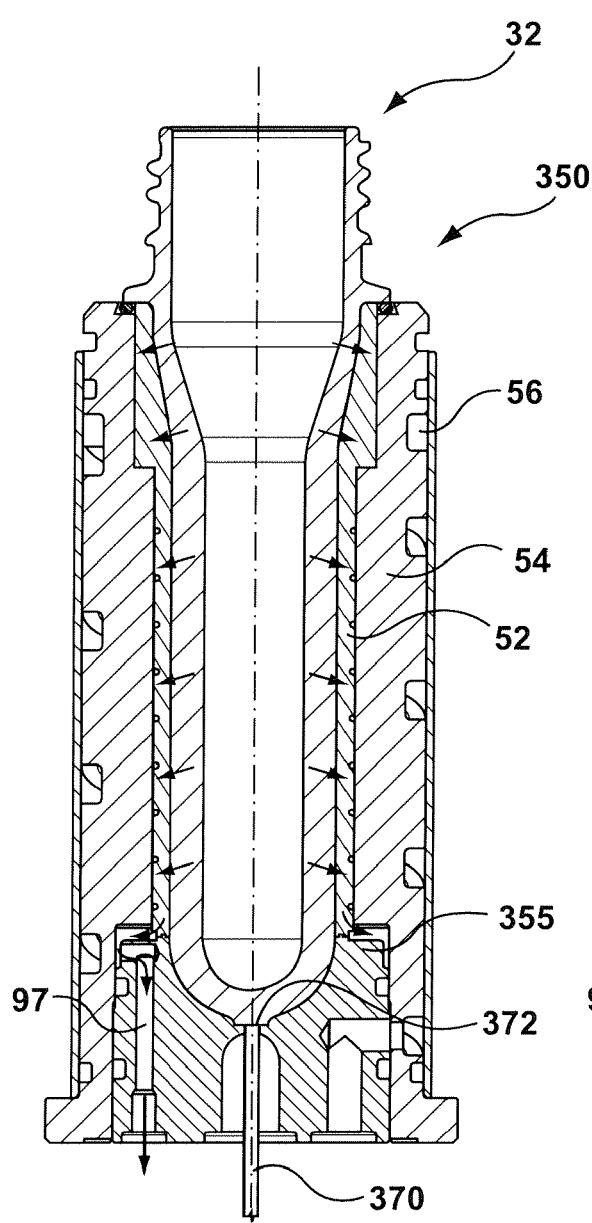
FIG. 5B depicts the section view of the cooling tube assembly of FIG. 5A, with the suction channel valve member being arranged in a closed configuration as a malleable preform is being cooled with an outer surface thereon having been expanded into contact with the porous inner conditioning surface of the conditioning cavity.
Figure 5C:
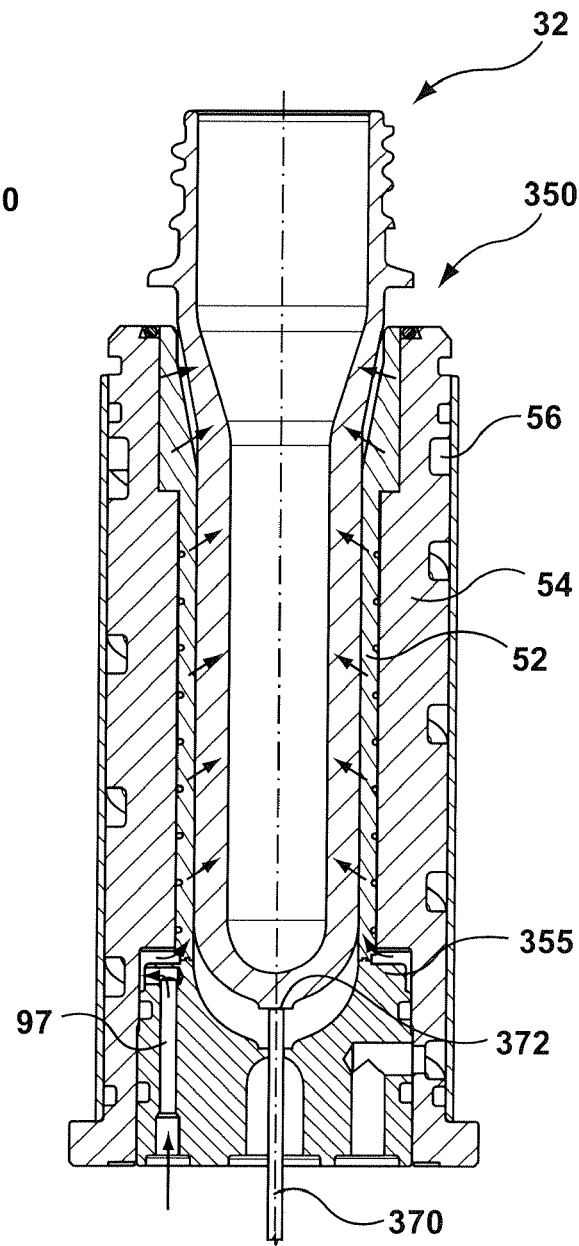
FIG. 5C depicts the section view of the cooling tube assembly of FIG. 5A, with the suction channel valve member being arranged in an extended configuration to assist in an ejection of the solidified preform.

With reference to FIGS. 5A, 5B, 5C, a cooling tube assembly 350 in accordance with a third alternative embodiment of the present invention is shown. The cooling tube assembly 350 is configured substantially the same as the embodiment of the invention, and as shown with reference to FIGS. 2 and 3A and as previously described, the differences being in the configuration of the suction channel 396 and the valve member 370. Accordingly, only the differences in structure and operation will be described.

The suction channel 396 preferably includes the following portions, listed from top to bottom. An orifice that is configured at the interface between the suction channel 396 and the inner conditioning surface 61C. A cylindrical sealing portion 374 that is configured to receive a complementary cylindrical sealing portion 374' configured around a distal tip of a slender cylindrical valve member 370. A cylindrical bore 376, with an arbitrarily shaped spherical end portion 373, that provides an annular pressure bypass channel (not shown) between an inner surface thereof and the outer surface of the valve member 370 to provide a fluid connection along the length of the valve member 270 in the open configuration. A distal end of the suction channel 296 being configured for connection with a suction pressure port 122 of the carrier plate 28.

Preferably, the valve member 370 is operated by a compound piston assembly 380 that is arranged in an end-of-arm-tool plate assembly 328, 329. The structure and operation of the piston assembly 380 is generally described with reference to commonly assigned U.S. Pat. RE 38,480, issued Mar. 30, 2004. In brief, the compound piston assembly 380 includes a first piston 384 arranged in first piston bore configured in a valve bushing 382, and a second piston 386 arranged in a second piston bore configured in the first piston 384. The valve member 370 includes a head 377 at an end thereof for connection with the second piston 386. The valve bushing 382 is arranged in a seat configured between a carrier plate 328, a valve plate 329, and a air manifold 327. The air manifold 327 connects the compound piston assembly 380 with air channels provided therein that can be pressurized in a sequence for positioning the valve member between an open, closed, or extended positions, as shown with reference to FIGS. 5A, 5B, & 5C, respectively. The extended position provides an added measure to ensure the ejection of the preform 32 after it has been fully conditioned as explained hereinbefore.

Figure 6:
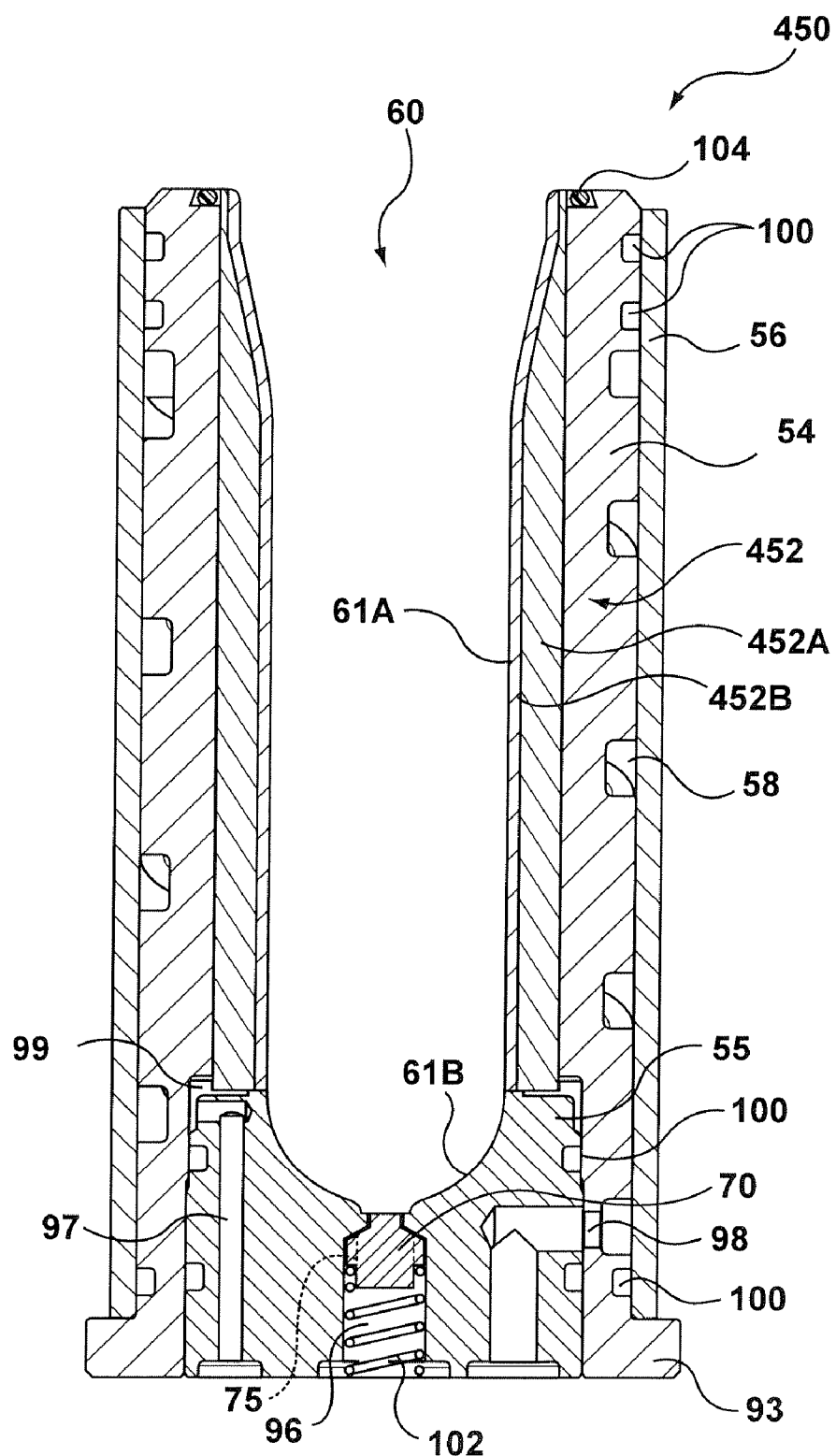
FIG. 6 depicts a section view of a cooling tube assembly according to a fourth alternative embodiment of the present invention that includes an alternative configuration of a porous insert that comprises an inner porous portion formed from a first porous material that is at least partially enclosed, on an outer surface thereof, by an outer porous portion formed from a second porous material, the outer porous portion being configured with a higher porosity to provide a suitable means for connecting the inner porous portion with an air pressure structure (not shown)

With reference to FIG. 6, a cooling tube assembly 450 in accordance with a fourth alternative embodiment of the present invention is shown. The cooling tube assembly 450 is configured substantially the same as the embodiment of the invention, and as shown with reference to FIGS. 2 and 3A and as previously described, the differences being in the configuration of the porous insert 452. Accordingly, only the differences in structure and operation will be described.

The porous insert 452 comprises a tubular body with an inner portion 452B preferably formed from a thermally conductive first porous material that is at least partially enclosed, on an outer surface thereof, by an outer porous portion 452A preferably formed from a second porous material. A porous inner conditioning surface 61A is configured the inner porous portion 452B that preferably reflects a shape of an outer surface of a body portion 80 of the preform 32. A network of interconnected interstitial spaces in the second porous portion 452A provide a pressure distribution structure that provides a fluid connection between the annular pressure channel 99 and the inner porous portion 452A. Similarly, a network of interconnected interstitial spaces in the first porous portion 452A provides a further connection to the inner porous surface 61A thereon. As before, an outer surface of the porous insert 452 is configured to be received in the second bore of the cooling tube 54.

The first porous material preferably comprises a sintered matrix of powder particles, of a thermally conductive material, having a predominant size in the range of 5 µm to 40 µm to produce resulting interstitial spaces of a size and shape that substantially avoids imparting a noticeable change in a finish of the outer surface of the preform 32. More preferably, the predominant size of said particle is in the range of 8 µm to 20 µm. More preferably still, the predominant particle size is chosen to be about 12 µm.

The second porous material preferably comprises a sintered matrix of powder particles, of a thermally conductive material, having a predominant size in the range of 20 µm to 100 µm to provide a relatively low pressure drop across the outer porous portion 452A for providing a fast and homogenous pressure response across the inner porous portion 452B. More preferably, the predominant size of said particle is in the range of 40 µm to 60 µm. More preferably still, the predominant particle size is chosen to be about 40 µm.

The first and second thermally conductive materials are preferably bronze particles. However, other suitable metals, and for processes for their configuration could be used. For example, the porous materials could be composed of a porous aluminum, such as commercially available METAPOR and PORCERAX (both trademarked materials from International Mold Steel Corporation). In addition, it may also be possible to use thermally conductive ceramics such as silicon carbide and a tungsten carbide.

Figure 7:
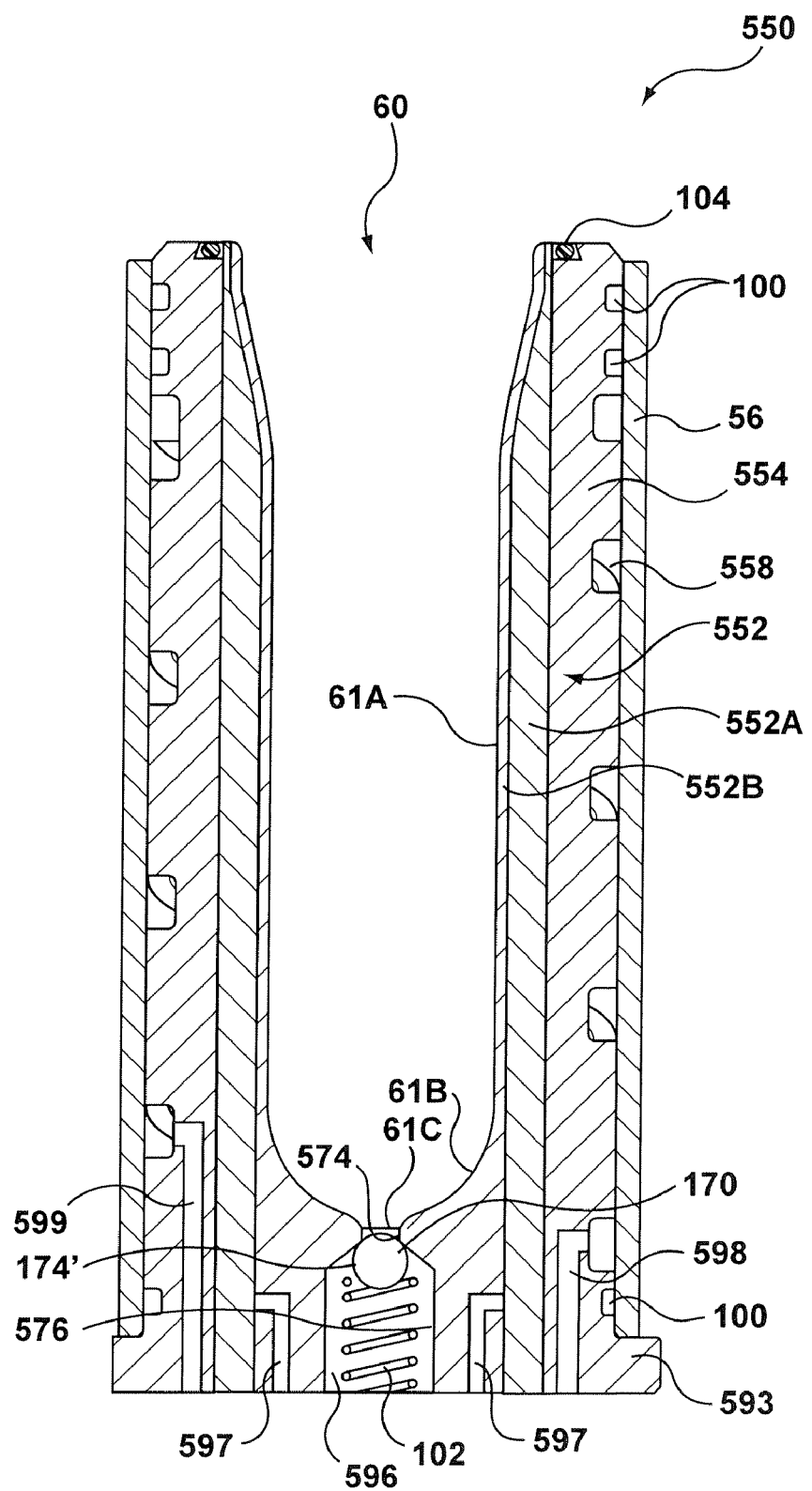
FIG. 7 depicts a section view of a cooling tube assembly according to a fifth alternative embodiment of the present invention that includes a variant to the porous insert of FIG. 6, wherein the inner porous insert is configured to provide a complete conditioning cavity.

With reference to FIG. 7, a cooling tube assembly 550 in accordance with a fifth alternative embodiment of the present invention is shown. The cooling tube assembly 550 is configured substantially the same as the fourth alternative embodiment of the invention, and as shown with reference to FIG. 6 and as previously described, the differences being in the configuration of the porous insert 552 and the obviation of the base insert 55. Accordingly, only the differences in structure and operation will be described.

The porous insert 552 comprises a cylindrical body with an inner portion 552B formed from a thermally conductive first porous material that is at least partially enclosed, on an outer surface thereof, by an outer porous portion 552A formed from a second porous material. A porous inner conditioning surface 61A, 61B, 61C is configured along the inner porous portion 552B that preferably reflects a shape of an outer surface of the body, end, and gate vestige portions 80, 80A, 82 of the preform (preform portions shown with reference to FIG. 3A).

A connecting pressure channel 597 is configured in the inner porous portion 552B between a bottom surface thereof, for connection with a pressure port 120 provided on the carrier plate 28, and the outer porous portion 552A. A network of interconnected interstitial spaces in the second porous portion 552A provide a pressure distribution structure that fluidly connects the connecting pressure channel 597 with the inner porous portion 552B. Similarly, a network of interconnected interstitial spaces in the first porous portion 552A provides a further connection to the inner porous surface 61A, 61B, 61C thereon. An outer surface of the porous insert 552 is configured to be received in a complementary bore that is configured in the cooling tube 554.

Also configured in the porous insert 552 is a suction channel 596 that is centrally located therein, and that extends longitudinally therethrough, from the bottom surface and through the bottom of the gate vestige inner conditioning surface portion 61C. The suction channel 596 is preferably configured to include the following portions, listed from top to bottom. An orifice that is configured at the interface between the suction channel 596 and the inner conditioning surface 61C. A spherical sealing portion 574 that is configured to cooperate with a complementary spherical outer surface 174' provided on a ball valve member 170, when the valve member is in a closed configuration. A cylindrical portion 576 that is configured to provide a passageway for a reciprocation of the ball valve member 170 therein, between the closed and an open configuration. The cylindrical portion 576 being configured to be wider than the diameter of the ball valve member 170 whereby an annular pressure bypass channel (not shown) is configured between therebetween that functions to provide a fluid connection along the length of the ball valve member in the open configuration. A distal end of the suction channel 596 being configured for connection with a suction pressure port 122 of the carrier plate 28.

The cooling tube 554 comprises a substantially tubular body. The tubular body including the first bore, longitudinally extending therethrough, that is configured for receiving the porous insert 552. An inlet and an outlet cooling channel 598 are configured in the tubular body that extend between a bottom face, for connection with coolant inlet and outlet ports 116 provided on a carrier plate 28 of said end-of-arm-tool 11, and ends of a cooling channel 558 configured in an outer surface of the cooling tube. The outer surface of the cooling tube 554 is further configured to cooperate with an inner surface of the sleeve 56 to sealingly enclose the cooling channel 558. Preferably, a groove is configured in a top surface of the cooling tube 554, adjacent the porous insert 552, for retaining an end seal 104 as previously described. A bottom portion of the cooling tube 554 is configured to include a flange 593 for arranging and retaining the cooling tube assembly 550 on the carrier plate 28.

Figures 8A, 8B:
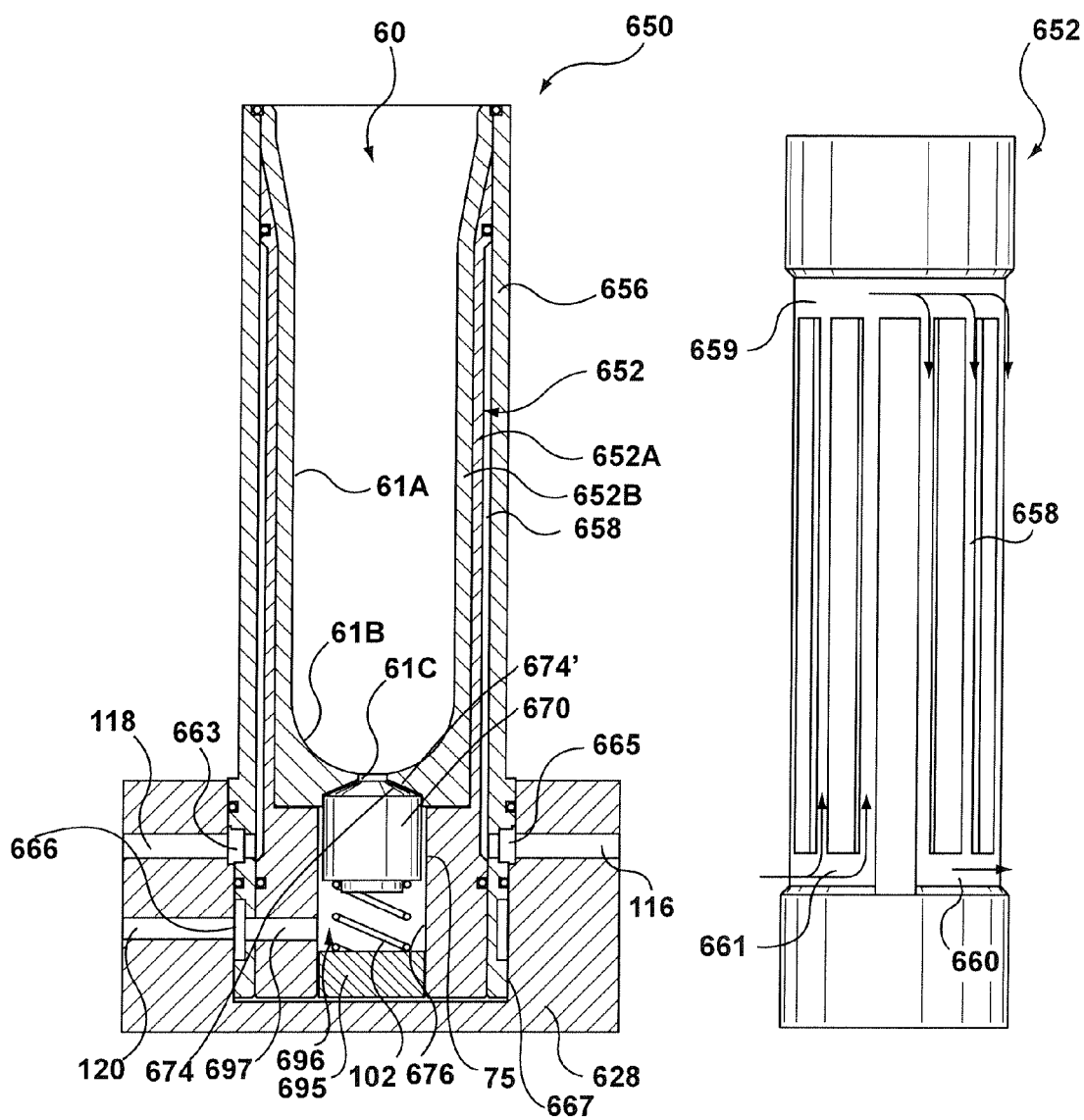
FIG. 8A depicts a section view of a cooling tube assembly according to a sixth alternative embodiment of the present invention that includes a variant to the porous insert of FIG. 7, wherein a network of cooling the inner porous insert is configured on an outer surface thereof that include a surface treatment for a substantial sealing thereof.
FIG. 8B depicts a side view of the cooling tube assembly of FIG. 8A showing the configuration of the network of cooling channels.

With reference to FIGS. 8A and 8B, a simplified cooling tube assembly 650 in accordance with a sixth alternative embodiment of the present invention is shown. The cooling tube assembly 650 includes a porous insert 652, a sleeve 656, and a valve member 670.

The porous insert 652 comprises a cylindrical body with an inner portion 652B formed from a thermally conductive first porous material that is at least partially enclosed, on an outer surface thereof, by an outer porous portion 652A formed from a second porous material. A porous inner conditioning surface 61A, 61B, 61C is configured along the inner porous portion 652B that preferably reflects a shape of an outer surface of the body, end, and gate vestige portions 80, 80A, 82 of the preform (preform portions shown with reference to FIG. 3A).

A suction channel 696 is configured in the porous member 652 that is centrally located therein and that extends longitudinally therethrough from the bottom surface and through the bottom of the gate vestige inner conditioning surface portion 61C. The suction channel 696 is preferably configured to include the following portions, listed from top to bottom. An orifice that is configured at the interface between the suction channel 696 and the inner conditioning surface 61C. A tapered sealing portion 674 that is configured to cooperate with a complementary sealing portion 674' provided on the valve member 670, when the valve member 670 is in a closed configuration. A cylindrical portion 676 that is configured to function as a valve cylinder for a reciprocation of the valve member 670 therein, between the closed and an open configuration. A distal end of the suction channel 696 being configured to receive a plug 695. A connecting pressure channel 697 being configured between an outer surface of the porous member and the suction channel 696 for connection with a suction pressure port 120 of the carrier plate 628, via a connecting channel 666 that is configured through the sleeve 656. A network of interconnected interstitial spaces in the second porous portion 652A provide a pressure distribution structure that fluidly connects the suction channel 696 with the inner porous portion 652B. Similarly, a network of interconnected interstitial spaces in the first porous portion 652A provides a further connection to the inner porous surface 61A, 61B, 61C thereon.

Preferably, a plurality of longitudinally directed coolant grooves 658 are configured in an outer surface of the porous insert 652 that extend between a pair of semi-circular coolant collector channels 660, 661 that are also configured in the outer surface of the porous insert 652 in proximity to the ends thereof for interconnecting the coolant grooves into contiguous coolant circuit. A surface treatment is provided along the outer surface of the porous insert 652, coolant grooves 658 and the collector grooves 660, 661 for a sealing thereof whereby the surfaces thereof are rendered substantially impervious to a leakage of a coolant media therethrough. The outer surface of the porous insert 652 is further configured to cooperate with an inner surface of the sleeve 656 to sealingly enclose the cooling circuit. The ends of the coolant circuit are configured to be connected to coolant inlet and outlet ports 116 provided on a carrier plate 628 of the end-of-arm-tool 11 via a pair of coolant connecting channels 663, 665 that are configured through the sleeve 656.

Preferably, the surface treatment is a chrome plating. Of course, other suitable surface treatments are possible such as other metal coatings, a polymeric coating, or a ceramic coating.

The sleeve 656 comprises a tubular body, the inner cylindrical surface of which is configured for receiving the porous insert 652 as described hereinbefore. A spigot portion 667 is configured along a lower portion of an outer surface of the sleeve 656. The spigot 667 is configured to cooperate with a complementary bore provided in the carrier plate 628 for arranging and retaining the cooling tube assembly 650 therein. Accordingly, the coolant and pressure connecting channels 663, 665, 666 are configured between the outer and inner surfaces of the sleeve 656 within the spigot portion 667.

The porous inserts of the present invention 52, 452, 552, 652 are preferably formed using the known method of gravity or "loose powder" sintering. In this method, a powder of a diffusion-bondable material (preferably bronze particles), graded for size, is poured into a mold cavity, which is a void in the shape of the finished part. These metal particles are then heated to their sintering temperature at which point a metallurgical bonding takes place, and joining "necks" are formed at contact points. Preferably, the mold is configured to have a core and a cavity portion (not shown), and that the core portion is shaped to correspond to the desired final shape of the molded article. If a highly toleranced shaped surface is required, then a post-sintering machining of the inner conditioning surface of the porous insert may be required.

Again, the basic method of performing a post-molding conditioning of a molded article using the conditioning apparatus of the present invention includes the following steps, listed in sequence. Molding of a malleable molded article 32. Configuring of a pressure structure 34 that is fluidly connected to the conditioning apparatus to function as a vacuum source. Moving the conditioning apparatus valve member 70 into an open configuration to connect the conditioning cavity to the vacuum source. Transferring the molded article, in a malleable state, from the molding cavity into the conditioning apparatus with the assistance of suction provided through the transfer flow structure. Moving the valve member into the closed configuration once a portion of the molded article has been sealingly received within the conditioning cavity. Expanding an outer surface of the portion of the molded article into contact with a cooled inner conditioning surface of the conditioning cavity by evacuating any air contained between the outer surface of the molded article and the inner conditioning surface of the conditioning body. Maintaining a vacuum to hold the outer surface of the preform in contact with the cooled inner conditioning surface of the conditioning cavity until the molded article has solidified to an extent required to maintain its shape once ejected from the conditioning apparatus. Lastly, ejecting the molded article from the conditioning cavity.

Preferably, the method also includes the step of performing a pressurized air purging of the conditioning apparatus upon ejection of the molded article.

Of course, the end seal 104 on any of the cooling tube assemblies 50, 150, 250, 350, 450, 550, 650 of the present invention could be located anywhere thereon that suits the shape of the molded article 32 and the portion thereof to be conditioned. For instance, to isolate an inwardly tapered upper portion (not shown) of a preform 32 it may be necessary to configure the end seal 104 to be substantially on the inner conditioning surface 61 of the cooling tube assembly. In addition, the end seal 104 may need not always be made from a conformable substance, but rather could, for instance, be configured as a flat, substantially rigid, upper surface of the cooling tube assembly 50 for cooperation with the corresponding flat bottom surface of the preform support ledge 86.

Alternatively, other molding system configurations are possible that could make use of the conditioning apparatus 50, 150, 250, 350, 450, 550, 650. As an example, the cooling tube assembly 50 could be configured in a post-molding conditioning station that is not configured to retrieve the molded article directly from the mold, but rather receives the molded article from an intermediate transfer apparatus. The foregoing intermediate transfer apparatus may, for example, include the end-of-arm-tool that is described in commonly assigned patent publication WO 2004/007170, published Jan. 22, 2004. As another example, the molding system may also include a blow molding machine. Furthermore, the molded article to be conditioned could also be compression molded, extrusion molded, or any other commonly known methods of molding plastic articles.

Alternatively, while the conditioning apparatus of the present invention are preferably configured to have a conditioning cavity that substantially reflects the shape of the molded article presented to it from the molding machine, it is without specific limitation thereto.

Alternatively, the conditioning apparatus of the present invention could be configured with a plurality of porous inserts therein.

Alternatively, the conditioning apparatus of the present invention could be configured to include a conditioning body that comprises a plurality of inserts that are formed from a thermally conductive material that is substantially without an intrinsic porosity. A plurality of flow micro-channels are configured between the inserts to provide a fluid connection between an air pressure structure and an inner surface configured on the plurality of inserts. The micro-channels are preferably configured on a thin spacer element that is arranged between adjacent inserts. Alternatively, the micro-channels could be etched of otherwise formed on the interfacing surfaces between the adjacent inserts.

The conditioning body is provided by a insert formed from a thermally conductive material, substantially without an intrinsic porosity, within which a plurality of flow channels are machined between an inside conditioning surface and an outer surface thereof. The flow channels may be formed using known methods such as spark erosion, and laser micro-machining.

Thus, what has been described is a conditioning apparatus for a post-molding conditioning of molded articles that includes a suction channel valve member, a multi-layer porous insert, a porous insert with a coolant channel formed directly thereon, methods of making the aforementioned, and a method of using a cooling tube assembly, which will greatly reduce the cost of such tubes in injection molding and/or improve the quality of molded articles, particularly preforms.

All U.S. and foreign patent documents, and articles, discussed above are hereby incorporated by reference into the

DETAILED DESCRIPTION OF THE PREFERRED EMBODIMENTS

The individual components shown in outline or designated by blocks in the attached figures are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. The scope of the following claims is to be accorded the broadest interpretation so as to encompass all such modifications and equivalent structures and functions.

What is claimed is:

1. A method for molding an article in a molding system that includes a molding machine and a post-molding molded article conditioning apparatus, the method including the steps of:

molding a molded article;

configuring a pressure structure connected to said conditioning apparatus to function as a vacuum source;

moving a valve member of said conditioning apparatus into an open configuration to connect a conditioning cavity of said conditioning apparatus to said vacuum source through a transfer flow structure of said conditioning apparatus;

transferring said molded article, in a malleable state, into said conditioning cavity with the assistance of suction provided through said transfer flow structure;

moving said valve member into a closed configuration once a portion of said molded article has been sealingly received within said conditioning cavity;

expanding an outer surface of said portion of said molded article into contact with a cooled inner conditioning surface of said conditioning cavity by evacuating any air contained between said outer surface of said molded article and said cooled inner conditioning surface through a plurality of openings configured along at least a portion of said cooled inner conditioning surface and through to said pressure structure via a pressure coupling structure of said conditioning apparatus;

maintaining a vacuum to hold said outer surface of said preform in contact with said cooled inner conditioning surface of said conditioning cavity until said molded article has solidified to an extent required to maintain its shape once ejected from said conditioning apparatus;

ejecting said molded article from said conditioning cavity.

2. The method in accordance with claim 1, wherein said step of ejection of said molded article further includes the step of configuring said pressure structure to function as a pressure source, and thereby release said vacuum, and thereby also performing a purge cleaning of said plurality of openings.

* * * * *